United States Patent
Weisbecker et al.

(10) Patent No.: US 6,444,021 B1
(45) Date of Patent: Sep. 3, 2002

(54) WATER WASHABLE LITHOGRAPHIC NEWSPAPER PRINTING INK

(75) Inventors: Carl S. Weisbecker, Mount Vernon; John H. Krech, Airmont, both of NY (US); Richard R. Durand, Jr., Wood-Ridge; Michelle J. Webb, Scotch Plains, both of NJ (US); Robert M. Warren, Windsor (GB)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/574,770

(22) Filed: May 19, 2000

(51) Int. Cl.$^7$ ................................................ C09D 11/02
(52) U.S. Cl. ................................ 106/31.66; 106/31.75; 106/31.86

(58) Field of Search ........................... 106/31.66, 31.75, 106/31.86

(56) References Cited

U.S. PATENT DOCUMENTS 5,778,789 A * 7/1998 Krishnan et al. ......... 106/31.73
5,837,045 A * 11/1998 Johnson et al. .......... 106/31.85
6,200,372 B1 * 3/2001 Krishnan et al. ........ 106/31.73

* cited by examiner

Primary Examiner—Helene Klemanski
Assistant Examiner—Veronica F. Faison
(74) Attorney, Agent, or Firm—Sidney Persley

(57) ABSTRACT

A water washable lithographic newspaper ink comprising: a modified soybean oil based resin; pigment; an acid neutralizing agent; and a humectant. In addition, the ink according to the present invention may also comprise water, and a rewetting agent, preferably hydroxyethyl ethylene urea.

26 Claims, No Drawings

WATER WASHABLE LITHOGRAPHIC NEWSPAPER PRINTING INK

FIELD OF THE INVENTION

The invention relates to water washable color newspaper printing inks.

DESCRIPTION OF RELATED ART

In an attempt to eliminate volatile organic compounds (VOCs) in the pressroom, water-based alternatives are being sought for ink formulations. Water-based printing inks for use in flexographic printing processes are known in the prior art. This type of printing process utilizes printing plates wherein the printing images stand up in relief, i.e. the areas to be printed are raised above the non-printing areas. Printing by the flexographic process requires relatively low pressure while sufficient pressure is applied to transfer the ink from the face of the image carrier to the surface of the substrate. Examples of useful water-based flexographic printing inks are disclosed in U.S. Pat. No. 4,173,554 and *The Printing Ink Manual,* edited by R. H. Leach and R. J. Pierce, pages 571–576, 5th edition, (Blueprint, 1993).

Water-based inks for gravure printing are also well known. In the gravure process, the printing image is engraved into a cylinder in the form of cells which become filled with ink. Printing is achieved by passing the substrate between the gravure cylinder and impression roller under pressure. Examples of useful water-based gravure printing inks are disclosed in U.S. Pat. Nos. 4,954,556 and 5,098,478.

The offset lithographic printing process presents a unique challenge to ink formulators since such process utilizes a planographic printing plate, i.e. the image and non-image areas are in the same plane on the image carrier, and two fluids are concurrently utilized.

It is fairly simple to define an image area by raising it above the background as in the case of the flexographic printing plate or lowering it as in the case of the gravure printing plate; avoidance of ink adhering to the non-image area is not too difficult to achieve. However, when all areas are on the same level, techniques must be utilized to insure that ink adheres only to the image area, and not to the non-image area.

In conventional offset lithographic printing processes, the plate is damped before it is inked with an oil-based ink. Typically, the damping process utilizes a fountain solution such as those described in U.S. Pat. Nos. 3,877,372, 4,278,467 and 4,854,969. Water will form a film on the hydrophilic areas (i.e. the non-image areas) of the printing plate, but will contract into tiny droplets on the oleophilic areas (i.e. the image areas). When an inked roller containing the oil-based ink is passed over the damped plate, it will be unable to ink the areas covered by the water film (the non-image areas), but will emulsify the droplets on the water-repellant areas (the image areas) and these will ink up. Such process is called offset lithography because the inked image on the plate does not directly print onto the paper substrate, but is first "offset" onto a rubber blanket, and transferred therefrom onto the paper substrate.

As mentioned above, conventional offset lithographic printing processes entails the use of oil-based inks and water-based fountain solutions. The ink/water balance is critical and is quite demanding of the pressman's skills. This issue is one of the several disadvantages associated with such printing processes as compared to flexographic and gravure printing processes. Moreover, the oil-based inks and aqueous fountain solutions typically employed in conventional offset lithographic printing processes contain fairly high levels of undesirable volatile organic compounds ("VOCs").

U.S. Pat. No. 3,356,030 discloses the use of a water-based printing ink in respect to a method of planographic printing utilizing a lithographic printing plate whose non-image areas are coated with a cured coating of a thermosetting silicone resin. However, the patented method also entails the use of a volatile hydrocarbon fountain solution which will coat the non-image areas and which is re-applied between successive printings. Of course, the use of a volatile hydrocarbon fountain solution undermines the principal purpose of the water-based ink compositions of the present invention, i.e. the avoidance of the use of volatile organic compounds ("VOCs") during the printing process. Indeed, the water-based ink compositions of the present invention may be used for offset lithographic printing processes without any fountain solution whatsoever.

In the 1980s, a resurgence of interest occurred in respect to "waterless" lithographic printing processes. Both positive and negative waterless planographic printing plates are commercially available from Toray Industries of Japan. The image area of a waterless planographic plate is a photopolymer similar to that employed for the image area of a conventional plate. However, the non-image area is coated with a polymer such as a silicone which is ink repellant. Further information about waterless printing plates and processes may be found in U.S. Pat. Nos. 5,370,906 and 5,417,749.

The waterless printing process solved two issues: VOCs emanating from the fountain solutions and control of the ink/water balance by the pressman. However, the difference in surface energy between the image and non-image areas of the conventional offset lithographic printing plate is typically 40 dynes/cm is dramatically reduced to 20 dynes/cm in the case of the waterless printing plate. Therefore the latitude between scumming and poor print density is considerably narrowed and the issue of VOCs (emanating from the oil-based ink) still remains in respect to waterless printing.

German Offenlegungsschrift DE 41 19 348 A1 pertains to a moistureless offset printing method and a water-based printing ink. The ink described therein is one which will adhere to hydrophilic materials, but not to hydrophobic materials, and contains a dye, water, 5–50% water-soluble macromolecular binder and a hygroscopic liquid, preferably a multihydric alcohol.

U.S. Pat. No. 5,725,646, which is incorporated herein by reference, describes a way of stabilizing a waterbased offset ink composition without drying up on a conventional multi roller ink train. Such composition eliminated the principal disadvantages of conventional offset lithographic printing inks, viz. high levels of VOCs emanating from the oil-based ink and the aqueous fountain solution and the difficulty in controlling the ink/water balance, while preserving the principal advantage of the conventional lithographic printing process, i.e. high surface energy differential between the image and non-image areas of the printing plate. It consists of using a rewetting agent, namely hydroxy ethyl ethylene urea. Since this rewetting agent does not dry, it remains in the final film making it susceptible to poor water resistance. Use of conventional rewetting agents, such as glycols and glycol ethers not only imparts poor water resistance to the final film, but also increases the tack of the formulations, thereby limiting its use on high speed presses.

GENERAL DESCRIPTION

While the prior art low VOC inks, including those described above, are water based, the inks according to the present invention are water washable. The ink compositions according to the present invention have demonstrated unexpected results having demonstrated that they provide performance characteristics that had not been previously realized. Water washable as used herein means, regardless of whether the inks contain water, they contain a modified soybean oil-based resin with acid values preferably between 20 and 50 in addition to acid neutralizing agents. This combination of ingredients at the indicated percentages causes the ink to readily disperse in water or aqueous detergent solutions that are commonly used for cleaning again yielding unexpected results. The resultant inks according to the present invention have been run at speeds up to 45,000 impressions per hour on standard newsprint grade paper on a commercial coldset press using waterless plates.

More specifically, it has been demonstrated that resins that are soluble regardless of pH as well as rosin resins can be eliminated in the water-washable ink formulation according to the present invention. It has also been demonstrated that water content may be from 0–40%, but preferably 10–20%, which is below the range of prior art water-based offset lithographic newspaper printing inks.

The discovery of a highly compatible soya resin system has yielded unexpected results, which now enable the formulation of a waterbased offset lithographic ink for newspaper printing that has low and stable tack and sustains runability. Once printed on the newspaper the ink has good rub resistance and a cost comparable to conventional oil-based newspaper inks.

Currently, all lithographic offset newspaper printing is done with inks which contain mineral oil or soy bean oils. These inks are also used in conjunction with a fountain solution which typically contains a desensitizer, a salt, and glycol. In order to prevent the evaporation of water from the printing rollers it was desirable to have constant humidity. This provided advantages over existing compositions, mainly zero VOC, water washability, and fast drying. It has now been found that the use of a certain soybean oil modified resins enable us to eliminate the humidity control requirement and use the existing multiple roller press set-up to print.

The printing plates for use with the newspaper printing ink of the present invention should be such that the image areas thereof are hydrophilic in nature, while the non-image areas are hydrophobic in nature. An example of a suitable printing plate is the "waterless" Toray type discussed above. However, the image area of the plate need not contain a photopolymer. The image area of the plate may comprise, e.g. a grained aluminum surface which has no coating thereon, but is hydrophilic in nature. The non-image area of the plate must, of course, be hydrophobic in nature. However, the non-image area may be covered with any type of hydrophobic material, provided that such hydrophobic material adheres to the non-images area of the plate during the printing process.

The water-washable color newspaper inks according to the present invention comprise a modified soybean oil-based resin, a pigment, an acid neutralization agent, and a humectant. It has been discovered that this combination of ingredients disclosed herein causes the ink to readily disperse in water or aqueous detergent solutions that are commonly used for cleaning. The modified soybean oil-based resin provides the water washability when the oil is neutralized in the ink formulation providing the washable characteristics of water. These changes significantly expand coverage possible for newspaper inks.

A water-washable color newspaper ink formula according to the present invention employs a modified soybean oil-based resin, which may comprise up to 30–60 wt. % of the ink composition, while the prior art water-based offset lithographic newspaper printing inks were delimited at 15–35% of the composition. Embodiments of the modified soybean oil-based resin according to the present invention are selected from the group consisting of: alkali refined soybean oil, maleic anhydride, ethoxylated 1,2-ethanediol, polyethylene glycol (PEG), such as Carbowax 400, PEG-6 methyl ether, such as Carbowax 350; and hydrated monobutyltin oxide, such as Fascat 4100. Normal soybean oil may be used to adjust physical properties as desired. Examples of soybean oil-based systems suitable for use in the present invention are described in U.S. Pat. Nos. 5,167,704 and 4,419,132, both of which are incorporated herein by reference, which describe, inter alia, non-petroleum soy based news inks.

The pigment according to the present invention may be any of those which are suitable for formulating offset lithographic printing inks such as CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26. The pigment according to the present invention may be in the range of 2–30 wt. %, and preferably in the range of 5–24 wt. %.

In embodiments according to the present invention suitable acid neutralization agents are selected from the group consisting of: monoethanolamine, in an amount of from about 1.0–about 3.5 wt. %, sodium hydroxide in an amount of from about 0.5–about 1.5 wt. %, and n-methyldiethanolamine in an amount of from about 2.0–about 7.0 wt %. In the preferred embodiment according to the present invention, glycerol is used as a humectant, which also reduces ink tack. It has been found that glycerol inhibits Bile undesirable accumulation of lint on blankets, plates, and form rollers on a high speed printing press when printing on low quality newsprint paper. The glycerol component to be used in the present invention is selected from the group consisting of: glycerol, polyglycerol, glycerine, diglycerine, triglycerine, tetraglycerine, pentaglycerine, polyglycerines higher than pentaglycerine and mixtures thereof. A preferred glycerine component is a mixture of glycerine and polyglycerines available from many manufacturers. This material is a hydroxyl functional liquid which consists of various glycerols in an aqueous solution having the following typical properties:

TABLE I

| | |
|---|---|
| viscosity, cp at 25° | 550–1800 |
| % OH | 20–26 |
| % water | 22–23 |
| solubility in water | infinite |
| density, g/ml | 1.27 |
| lb/gal | 10.6 |
| pH | >13 |
| color | dark brown |

Other suitable humectants in accordance with the present invention comprise propylene glycol, sorbitol, and triethylene glycol. The preferred amount of humectant according to the present invention is in the range of about 2–15%.

In the water-washable newspaper printing ink of the present invention the water may be present in amounts of 0 to 40 wt. %; and more preferably 10 to 20 wt. %. Prior art lithographic news inks typically included a macromolecular resin binder in amounts of 10 to 70 wt. %; and more preferably 30 to 60 wt. %; and most preferably the macromolecular resin binder is a composite having up to 5 wt. % of a resin binder soluble in water regardless of the pH of the water; 10 to 70 wt. % of a resin binder soluble in water at a pH ranging lo- from 7.5 to 10; and up to 20 wt. % of an aqueous emulsion resin binder. The waterless offset lithographic news ink according to the present invention the binder resin content has been reduced to zero (0).

If desired, in accordance with the present invention, the preferred rewetting agent is hydroxyethyl ethylene urea (HEEU). HEEU is preferably in the range of 0–10% according to the present invention. If desired, in accordance with the present invention, the usual adjuvants such as waxes, anti-foam agents, biocides, surfactants, corrosion inhibitors, etc. may be incorporated in the inks of the present invention. If desired, in accordance with the present invention, a non-ionic surfactant is employed in the amount of up to 5 wt. %. Suitable examples of the surfactant include acetylenic glycols, ethoxylated glycols and sorbitan esters.

The waterless news ink of the present invention are further illustrated by the following non-limiting examples in which all parts and percentages are by weight, unless otherwise indicated.

EXAMPLE 1

A water-based color news ink was prepared from the components indicated below. The water phase was supplied in the form of an aqueous dispersion containing clay, glycerol, and hydroxyethyl ethylene urea. Hydroxyethyl ethylene urea was added in the form of a 75 wt. % solution in water. The pigment was supplied in the form of a flushed dispersion in modified soybean oil based varnish.

| Component | |
|---|---|
| Phthalo Blue Pigment | 10.9 |
| Varnish I | 47.6 |
| Water | 17.0 |
| Glycerol | 5.0 |
| Monoethanolamine | 2.4 |
| Hydroxyethyl Ethylene Urea | 9.4 |
| Laponite RD Clay | 1.2 |
| Fancol VB | 6.5 |
| Total: | 100.0 |
| Varnish I Composition | |
| Alkali Refined Soybean Oil | 79.9 |
| Maleic Anhydride | 10.0 |
| Carbowax 400 | 10.0 |
| Fascat 4100 | 0.1 |
| Total: | 100.0 |
| Tack after 6 min. @ 1000 rpm: | 11.4 gram meters |
| Viscosity @ 5 $s^{-1}$: | 265 Poise |
| Viscosity @ 10 $s^{-1}$: | 228 Poise |
| Viscosity @ 100 $s^{-1}$: | 164 Poise |

(a) Fancol is a trademark of Fanning Corp.
(b) Laponite is a trademark of Southern Clay Products Co.

A water-based newspaper printing ink was prepared in accordance with Example 1. The ink was run on a Heidelberg Web Systems Mercury-Y printing press. The printing plate, obtained from Toray Industries, had an aluminum substrate coated with a photopolymer whose surface was oleophilic in nature; the non-image area was coated with an oleophobic silicone elastomer. The press run was carried out at a press speed of 40,000 cph with printing onto Bowater 30 lb. newsprint stock. Samples obtained from the press run exhibited sharp, well defined, dry images of excellent print quality. The non-image area exhibited negligible toning, and the image area achieved a print density of 0.89, measured with a densitometer.

EXAMPLE 2

A water-based black news ink was prepared from the components indicated below. The water phase was supplied in the form of an aqueous dispersion containing clay and hydroxyethyl ethylene urea. Hydroxyethyl ethylene urea was added in the form of a 75 wt. % solution in water. The pigment was supplied in the form of a shot-milled base containing Fancol VB, modified soybean oil based varnish, and carbon black.

| Component | Amount (wt. %) |
|---|---|
| Cabot Black Pearls 420 Carbon | 14.6 |
| Varnish I | 38.0 |
| Water | 20.1 |
| Glycerol | 10.0 |
| Monoethanolamine | 1.8 |
| Hydroxyethyl Ethylene Urea | 8.5 |
| Laponite RD Clay | 1.1 |
| Fancol VB | 5.9 |
| Total: | 100.0 |
| Tack after 6 min. @ 1000 rpm: | 1.5 gram meters |
| Viscosity @ 5 $s^{-1}$: | 1152 Poise |
| Viscosity @ 10 $s^{-1}$: | 952 Poise |
| Viscosity @ 100 $s^{-1}$: | 194 Poise |

(a) Fancol is a trademark of Fanning Corp.
(b) Laponite is a trademark of Southern Clay Products Co.

A water-based newspaper printing ink was prepared in accordance with Example 2. The ink was run on a Heidelberg Web Systems Mercury-Y printing press. The printing plate, obtained from Toray Industries, had an aluminum substrate coated with a photopolymer whose surface was oleophilic in nature; the non-image area was coated with an oleophobic silicone elastomer. The temperature of the press increased from 74–106° F. during the run. The relative humidity in the press room was 22%. The press run was carried out at a press speed of 45,000 cph with printing onto Bowater 30 lb. newsprint stock. Samples obtained from the press run exhibited sharp, well defined, dry images of excellent print quality. The non-image area exhibited negligible toning, and the image area achieved a print density of 1.00, measured with a densitometer. This ink was used to print more than 10,000 copies, and minimal linting was observed on the blanket, printing plate, or forme rollers after the run.

EXAMPLE 3

A water-based color news ink was prepared from the components indicated below. The water phase was supplied in the form of an aqueous dispersion containing clay and hydroxyethyl ethylene urea. Hydroxyethyl ethylene urea was added in the form of a 75 wt. % solution in water. Sodium hydroxide was supplied in the form of a 50 wt. % solution in water. The pigment was supplied in the form of a flushed dispersion in modified soybean oil based varnish.

| Component | Amount (wt %) |
|---|---|
| Phthalo Blue Pigment | 10.6 |
| Varnish I | 47.8 |
| Water | 22.2 |
| Sodium Hydroxide | 1.3 |
| Monoethanolamine | 2.9 |
| Hydroxyethyl Ethylene Urea | 9.2 |
| Laponite RD Clay | 1.1 |
| Akzo Filtrez 515 Resin | 4.9 |
| Total: | 100.0 |
| Tack after 6 min. @ 1000 rpm: | 9.9 gram meters |
| Viscosity @ 5 $s^{-1}$: | 126 Poise |
| Viscosity @ 10 $s^{-1}$: | 94 Poise |
| Viscosity @ 100 $s^{-1}$: | 68 Poise |

(a) Fancol is a trademark of Fanning Corp.
(b) Laponite is a trademark of Southern Clay Products Co.

A water-based newspaper printing ink was prepared in accordance with Example 3. This ink exhibited a sharp, well defined, dry image of excellent print quality when printed using an RNA-52 Printability Tester from Research North America. The non-image area exhibited negligible toning.

EXAMPLE 4

A water-based black news ink was prepared from the components indicated below. The water phase was supplied in the form of an aqueous dispersion containing clay, glycerol, and hydroxyethyl ethylene urea. Hydroxyethyl ethylene urea was added in the form of a 75 wt. % solution in water. The pigment was supplied in the form of a shot-milled base containing Fancol VB, modified soybean oil based varnish, and carbon black.

| Component | Amount (wt %) |
|---|---|
| Cabot Black Pearls 420 Carbon | 13.5 |
| Varnish I | 37.4 |
| Varnish II | 6.0 |
| Water | 16.7 |
| Glycerol | 10.0 |
| Monoethanolamine | 1.3 |
| n-Methyldiethanolamine | 2.3 |
| Hydroxyethyl Ethylene Urea | 8.5 |
| Laponite RD Clay | 1.6 |
| Fancol VB | 2.7 |
| Total | 100.0 |
| Varnish II Composition | |
| Alkali Refined Soybean Oil | 74.3 |
| Maleic Anhydride | 9.3 |
| Carbowax 350 | 16.3 |
| Fascat 4100 | 0.1 |
| Total: | 100.0 |
| Tack after 6 min. @ 1000 rpm: | 11.5 gram meters |

(a) Fancol is a trademark of Fanning Corp.
(b) Laponite is a trademark of Southern Clay Products Co.

A water-washable newspaper printing ink was prepared in accordance with Example 4. This ink exhibited a sharp, well-defined, dry image of excellent print quality when printed.

EXAMPLE 5

A water-based color news ink was prepared from the components indicated below. The water phase was supplied in the form of a 25 wt. % solution in hydroxyethyl ethylene urea. Hydroxyethyl ethylene urea was added in the form of a 75 wt. % solution in water. The pigment was supplied in the form of a flushed dispersion in modified soybean oil based varnish.

| Component | Amount (wt %) |
|---|---|
| Phthalo Blue Pigment | 10.9 |
| Varnish I | 51.7 |
| Water | 3.8 |
| Monoethanolamine | 2.4 |
| Hydroxyethyl Ethylene Urea | 11.2 |
| Fancol VB | 20.0 |
| Total: | 100.0 |
| Tack after 6 min. @ 1000 rpm: | 8.8 gram meters |
| Yield Strength: | 91 dynes/$cm^2$ |
| Viscosity (Casson Eq. Fit): | 80 Poise |

(a) Fancol is a trademark of Fanning Corp.

A water-washable newspaper printing ink was prepared in accordance with Example 5. This ink exhibited a sharp, well-defined, dry image of excellent print quality when printed.

EXAMPLE 6

A water-based color news ink was prepared from the components indicated below. The water phase was supplied in the form of an aqueous dispersion containing clay, glycerol, and hydroxyethyl ethylene urea. Hydroxyethyl ethylene urea was added in the form of a 75 wt. % solution in water. The pigment was supplied in the form of a flushed dispersion in modified soybean oil based varnish. An antioxidant, butylated hydroxytoluene, was incorporated into the flushed dispersion at 0.6 wt.

| Component | Amount (wt %) |
|---|---|
| Phthalo Blue Pigment | 12.8 |
| Varnish I | 28.2 |
| Varnish II | 12.5 |
| Water | 14.8 |
| Glycerol | 10.0 |
| n-Methyldiethanolamine | 4.5 |
| Hydroxyethyl Ethylene Urea | 11.2 |
| Laponite RDS Clay | 1.2 |
| Edible Soybean Oil | 4.8 |
| Total: | 100.0 |
| Tack after 6 min. @ 1000 rpm: | 10.2 gram meters |

(a) Fancol is a trademark of Fanning Corp.
(b) Laponite is a trademark of Southern Clay Products Co.

A water-washable newspaper printing ink was prepared in accordance with Example 6. This ink exhibited a sharp, well-defined, dry image of excellent print quality when printed.

EXAMPLE 7

A water-washable color news ink was prepared from the components indicated below. The pigment was supplied in the form of a flushed dispersion in modified soybean oil-based varnish.

| Component | Amount (wt %) |
|---|---|
| Phthalo Blue Pigment | 17.1 |
| Varnish I | 37.9 |
| Varnish II | 38.0 |
| Glycerol | 2.5 |
| n-Methyldiethanolamine (MDEA) | 4.5 |
| Total: | 100.0 |
| Tack after 1 min. @ 1000 rpm: | 9.9 gram meters |
| Viscosity @ 5 s$^{-1}$: | 434 poise |
| Viscosity @ 10 s$^{-1}$: | 337 poise |
| Viscosity @ 100 s$^{-1}$: | 206 poise |

A water-washable newspaper printing ink was prepared in accordance with Example 7. This ink exhibited a sharp, well-defined, dry image of excellent print quality when printed on an RNA-52 Printability Tester from Research North America. The ink exhibited a slight tendency to mist on the Inkometer.

EXAMPLE 8

A water-washable color news ink was prepared from the components indicated below. The water phase was supplied in the form of a flushed dispersion in modified soybean oil-based varnish. Hydroxyethyl ethylene urea was added in the form of a 75 wt. % solution in water, supplied by Sartomer Corporation as SR-511. The Laponite RD was added in the form of a dispersion in water and SR-511.

| Component | Amount (wt. %) |
|---|---|
| Phthalo Blue Pigment | 10.3 |
| Varnish I | 46.8 |
| Akzo Filtrez 515 | 4.7 |
| Propylene Glycol | 5.0 |
| Hydroxyethyl Ethylene Urea | 8.7 |
| Laponite RD$^a$ | 1.1 |
| Water | 20.5 |
| Monoethanolamine (MEA) | 2.9 |
| Total: | 100.0 |
| Tack after 6 min @ 1000 rpm: | 22.6 gram meters |

(a) Laponite is a trademark of Southern Clay Products Co.

A water-washable newspaper printing ink was prepared in accordance with Example 8. This ink exhibited a sharp, well-defined, dry image of excellent print quality when printed on an RNA-52 Printability Tester from Research North America.

The present invention has been described in detail, including the preferred embodiments thereof. However, it will be appreciated that those skilled in the art, upon consideration of the present disclosure, may make modifications and/or improvements on the invention that fall within the scope and spirit of this invention as set forth in the following claims.

What is claimed is:

1. A water washable ink for offset lithographic newspaper printing comprising:
   (a) a modified soybean oil-based resin;
   (b) pigment;
   (c) an acid neutralization agent;
   (d) a humectant; and
   (e) water, in an amount of from 0 to less than 5 wt % based on the total weight of the ink.

2. The ink of claim 1, wherein the amount of modified soybean oil bases resin present is 30–60 wt %.

3. The ink of claim 2, wherein the modified soybean oil based resin is selected from the group consisting of: an alkali refined soybean oil, a maleic anhydride, a polyethylene glycol (PEG), and a hydrated monobutyltin oxide.

4. The ink of claim 2, wherein the modified soybean oil based resin comprises an alkali refined soybean oil, a maleic anhydride, a methyl ether of a polyethylene glycol (PEG) having an average molecular weight of 600 (PEG-6), and a hydrated monobutyltin oxide.

5. The ink of claim 2, wherein the modified soybean oil based resin is selected from the group consisting of: an alkali refined soybean oil, a maleic anhydride, a polyethylene glycol (PEG), a, methyl ether of a PEG having an average molecular weight of 600 (PEG-6 and a hydrated monobutyltin oxide.

6. The ink of claim 1, wherein the amount of pigment present is 2–30 wt. %.

7. The ink of claim 1, wherein the amount of pigment present is 5–24 wt. %.

8. The ink of claim 1, wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

9. The ink of claim 8, wherein the amount of pigment present is 2–30 wt. %.

10. The ink of claim 8, wherein the amount of pigment present is 5–24 wt. %.

11. The ink of claim 1, wherein the amount of acid neutralization present is 0.5 to 7 wt %.

12. The ink of claim 1, wherein the acid neutralization agent is selected from the group consisting of: monoethanolamine and sodium hydroxide.

13. The ink of claim 1, wherein the acid neutralization agent is selected from the group consisting of: monoethanolamine and n-methyldiethanolamine.

14. The ink of claim 1, wherein the acid neutralization agent is methyldiethanolamine.

15. The ink of claim 1, wherein the humectant is glycerol.

16. The ink of claim 15, wherein the glycerol present is selected from the group consisting of: glycerol, polyglycerol, glycerine, diglycerine, triglycerine, tetraglycerine, pentaglycerine, polyglycerines higher than pentaglycerine, and mixtures thereof.

17. The ink of claim 1, wherein the humectant is propylene glycol.

18. The ink of claim 1, wherein the humectant is triethylene glycol.

19. The ink of claim 1, wherein the humectant is in the range of about 2–15 wt. %.

20. The ink of claim 19, wherein the humectant is glycerol.

21. The ink of claim 19, wherein the glycerol present is selected from the group consisting of: glycerol, polyglycerol, glycerine, diglycerine, triglycerine, tetraglycerine, pentaglycerine, polyglycerines higher than pentaglycerine, and mixtures thereof.

22. The ink of claim 19, wherein the humectant is propylene glycol.

23. The ink of claim 19, wherein the humectant is triethylene glycol.

24. The ink of claim 1, further comprising water, wherein the water present is 0 to 40 wt %.

25. The ink of claim 1, further comprising water, wherein the water present is 10 to 20 wt %.

26. The ink of claim 1, further comprising a rewetting agent, wherein the rewetting agent is about 0 to 10 wt %.

* * * * *